US008522875B2

(12) United States Patent
Leshchyshyn et al.

(10) Patent No.: US 8,522,875 B2
(45) Date of Patent: Sep. 3, 2013

(54) HYDROCARBON-BASED FRACTURING FLUID COMPOSITIONS, METHODS OF PREPARATION AND METHODS OF USE

(75) Inventors: Timothy Tyler Leshchyshyn, Calgary (CA); Peter William Beaton, Calgary (CA); Thomas Michael Coolen, Calgary (CA)

(73) Assignee: Calfrac Well Services Ltd., Alberta (CA)

( * ) Notice: Subject to any disclaimer, the term of this patent is extended or adjusted under 35 U.S.C. 154(b) by 0 days.

(21) Appl. No.: 13/523,842

(22) Filed: Jun. 14, 2012

(65) Prior Publication Data

US 2012/0247776 A1    Oct. 4, 2012

Related U.S. Application Data

(60) Division of application No. 12/457,559, filed on Jun. 16, 2009, now Pat. No. 8,211,834, which is a continuation-in-part of application No. 12/207,731, filed on Sep. 10, 2008, now abandoned.

(30) Foreign Application Priority Data

Jul. 25, 2008   (CA) .................................... 2635989

(51) Int. Cl.
*E21B 43/267*   (2006.01)
*C09K 8/68*   (2006.01)

(52) U.S. Cl.
USPC ................. 166/300; 166/177.5; 166/280.1; 166/308.1; 166/308.4; 507/202; 507/271

(58) Field of Classification Search
None
See application file for complete search history.

(56) References Cited

U.S. PATENT DOCUMENTS

| 3,990,978 | A | | 11/1976 | Hill |
| 4,265,311 | A | | 5/1981 | Ely |
| 4,627,495 | A | | 12/1986 | Harris et al. |
| 5,310,002 | A | | 5/1994 | Blauch et al. |
| 5,562,160 | A | | 10/1996 | Brannon et al. |
| 5,990,053 | A | * | 11/1999 | Jones et al. .................. 507/238 |
| 6,138,760 | A | | 10/2000 | Lopez et al. |

(Continued)

FOREIGN PATENT DOCUMENTS

| CA | 2234546 | 6/1997 |
| CA | 2357973 | 4/2002 |

(Continued)

OTHER PUBLICATIONS

Canadian Intellectual Property Office (CIPO), Non-Final Office Action in CA Appln. No. 2,671,204, Nov. 6, 2009.

(Continued)

*Primary Examiner* — George Suchfield
(74) *Attorney, Agent, or Firm* — Davidson Berquist Jackson & Gowdey, LLP (57) ABSTRACT

The invention describes improved fracturing compositions, methods of preparing fracturing compositions and methods of use. Importantly, the subject invention overcomes problems in the use of mists as an effective fracturing composition particularly having regard to the ability of a mist to transport an effective volume of proppant into a formation. As a result, the subject technologies provide an effective economic solution to using high ratio gas fracturing compositions that can be produced in a continuous (i.e. non-batch) process without the attendant capital and operating costs of current pure gas fracturing equipment.

17 Claims, 4 Drawing Sheets

(56) References Cited

U.S. PATENT DOCUMENTS

| | | | |
|---|---|---|---|
| 6,159,907 | A | 12/2000 | Van Slyke |
| 6,255,256 | B1 | 7/2001 | Van Slyke |
| 6,302,209 | B1 * | 10/2001 | Thompson et al. ........ 166/305.1 |
| 6,582,819 | B2 | 6/2003 | McDaniel et al. |
| 6,620,769 | B1 | 9/2003 | Juppe et al. |
| 6,838,418 | B2 | 1/2005 | Allan et al. |
| 6,844,297 | B2 | 1/2005 | Allan et al. |
| 7,078,370 | B2 | 7/2006 | Crews |
| 7,231,976 | B2 | 6/2007 | Berry et al. |
| 7,261,158 | B2 | 8/2007 | Middaugh et al. |
| 7,304,019 | B2 | 12/2007 | Lin et al. |
| 7,306,041 | B2 | 12/2007 | Milne et al. |
| 7,377,721 | B2 | 5/2008 | Patel |
| 7,392,844 | B2 | 7/2008 | Berry et al. |
| 7,741,252 | B2 | 6/2010 | Chen et al. |
| 8,288,324 | B2 | 10/2012 | Sunkara |
| 2002/0160921 | A1 | 10/2002 | Taylor et al. |
| 2004/0018943 | A1 | 1/2004 | Pyecroft et al. |
| 2004/0159433 | A1 | 8/2004 | England et al. |
| 2005/0065041 | A1 | 3/2005 | Hill |
| 2007/0000666 | A1 * | 1/2007 | Vozniak et al. ............ 166/308.1 |
| 2007/0023184 | A1 | 2/2007 | Jackson et al. |
| 2007/0197402 | A1 * | 8/2007 | O'neil et al. .................. 507/238 |
| 2007/0204991 | A1 | 9/2007 | Loree et al. |
| 2008/0051301 | A1 | 2/2008 | Chen et al. |
| 2008/0261836 | A1 | 10/2008 | Filler et al. |
| 2008/0271891 | A1 | 11/2008 | Hutchins et al. |
| 2009/0183874 | A1 * | 7/2009 | Fordyce et al. ............ 166/280.1 |
| 2009/0301719 | A1 * | 12/2009 | Bull et al. .................. 166/280.2 |
| 2010/0018707 | A1 * | 1/2010 | Wheeler et al. ............... 166/276 |
| 2010/0044049 | A1 | 2/2010 | Leshchyshyn et al. |
| 2010/0051272 | A1 * | 3/2010 | Loree et al. .................. 166/279 |

FOREIGN PATENT DOCUMENTS

| | | |
|---|---|---|
| CA | 2576075 | 2/2008 |
| EP | 1236863 | 9/2002 |
| WO | WO 97/21022 | 4/2002 |
| WO | WO 2006/017623 A | 2/2006 |

OTHER PUBLICATIONS

U.S. Appl. No. 12/457,559—Aug. 3, 2011 PTO Office Action.
U.S. Appl. No. 12/458,763—Sep. 26, 2011 PTO Office Action.
U.S. Appl. No. 12/458,763—Apr. 4, 2012 PTO Office Action.
U.S. Appl. No. 12/509,544—Dec. 16, 2011 PTO Office Action.
U.S. Appl. No. 12/458,763—Oct. 19, 2012 PTO Office Action.

* cited by examiner

FIGURE 1

HYDROCARBON-BASED FRACTURING FLUID COMPOSITIONS, METHODS OF PREPARATION AND METHODS OF USE

RELATED APPLICATIONS

This application is a divisional of U.S. patent application Ser. No. 12/457,559, filed Jun. 16, 2009, and titled, "Hydrocarbon-Based Fracturing Fluid Compositions, Methods Of Preparation And Methods Of Use," The entire contents of which are fully incorporated herein by reference for all purposes. U.S. patent application Ser. No. 12/457,559 is a continuation-in-part of U.S. patent application Ser. No. 12/207,731 filed Sep. 10, 2008. This application claims priority to Canadian Patent Application No. 2,635,989 filed Jul. 25, 2008.

FIELD OF THE INVENTION

The invention describes improved fracturing compositions, methods of preparing fracturing compositions and methods of use. Importantly, the subject invention overcomes problems in the use of mists and/or slugs as an effective fracturing composition particularly having regard to the ability of a mist to transport an effective volume of proppant into a formation. As a result, the subject technologies provide an effective economic solution to using high ratio gas fracturing compositions that can be produced in a continuous (i.e. non-batch) process without the attendant capital and operating costs of current pure gas fracturing equipment.

BACKGROUND OF THE INVENTION

As is well known in the hydrocarbon industry, many wells require "stimulation" in order to promote the recovery of hydrocarbons from the production zone of the well.

One of these stimulation techniques is known as "fracturing" in which a fracturing fluid composition is pumped under high pressure into the well together with a proppant such that new fractures are created and passageways within the production zone are held open with the proppant. Upon relaxation of pressure, the combination of the new fractures and proppant having been forced into those fractures increases the ability of hydrocarbons to flow to the wellbore from the production zone.

There are a significant number of fracturing techniques and fluid/proppant compositions that promote the formation of fractures in the production zone and the delivery of proppants within those fractures. The most commonly employed methodologies seek to create and utilize fracturing fluid compositions having a high viscosity that can support proppant materials so that the proppant materials can be effectively carried within the fracturing fluid. In other words, a viscous fluid will support a proppant within the fluid in order that the proppant can be carried a greater distance within the fracture or in some circumstances carried at all. In addition, fracturing fluids are commonly designed such that upon relaxation of viscosity (or other techniques) and over time (typically 90 minutes or so), the fluid viscosity drops and the proppant is "dropped" in the formation, and the supporting fluid flows back to the wellbore. The proppant, when positioned in the fracture seeks to improve the permeability of the production zone in order that hydrocarbons will more readily flow to the well. An effective fracturing operation can increase the flow rate of hydrocarbons to the well by at least one order of magnitude by reducing well to formation communication impairment. Many wells won't produce long term in an economic manner without being stimulated by methods such as fracturing.

Fracturing fluid compositions are generally characterized by the primary constituents within the composition. The most commonly used fracturing fluids are water-based or hydrocarbon-based fluids, defined on the basis of either water or a hydrocarbon being the primary constituent of the specific composition. Each fracturing fluid composition is generally chosen on the basis of the subterranean formation characteristics and the economics of conducting a fracturing operation at a particular well or group of wells.

In the case of hydrocarbon-based fluids, in order to increase the viscosity of liquid hydrocarbon, various "viscosifying" additives may be added to the hydrocarbon-based fluid at the surface such that the viscosity of the hydrocarbon-based fluid is substantially increased thereby enabling it to support proppant. As is known, these hydrocarbon-based fluids may include other additives such as breakers and/or other additives to impart various properties to the fluid as known to those skilled in the art. The most commonly used viscosifying additives are phosphate esters and metal complexors that are used to create fluids having moderate to high viscosities.

During a fracturing operation, the fracturing composition (without any proppant) is initially pumped into the well at a sufficiently high pressure and flow rate to fracture the formation. After fracturing has been initiated, proppant is added to the fracturing fluid, and the combined fracturing fluid and proppant is forced into the fractures in the production zone. When pressure is released and over time (typically 90 minutes), the viscosity of the fracturing fluid drops so that the proppant separates or drops out of the fracturing fluid within the formation and the "de-viscosified" fracturing fluid flows back to the well where it is removed up the well back to the wellhead at surface.

Problems in this type of fracturing are the volumes and cost of liquid hydrocarbon required and the attendant issues relating to the disposal of the liquid hydrocarbon that has been pumped downhole and ultimately recovered from the well. As a result, in some cases the industry has moved away from pure hydrocarbon-based fracturing fluids in favor of those technologies that utilize a high proportion of gas (usually nitrogen) as the fracturing fluid, or cheaper fluids such as aqueous fluids.

The use of a high proportion of gas has several advantages including minimizing formation damage, reducing fluid supply costs as well as a reduction in the fluid disposal costs of fluid that is recovered from the well. For example, whereas liquid hydrocarbon may reduce the ability of a production zone to flow by adherence to pore throats in the matrix rock of the formation and/or by hydrostatically holding back the formation with a column of flow back fluid in the well, high gas compositions will often minimize such damage and/or effects and will otherwise migrate from the formation more readily. In addition, gas injected and thus recovered from a well can simply be released to the atmosphere thereby obviating the need for decontamination and disposal of a substantial volume of non-gaseous materials recovered from the well.

With high ratio gas fracturing compositions, the characteristics of the compositions can be similarly controlled or affected by the use of additives. Generally, gas fracturing compositions can be characterized as a pure gas fracturing composition (typically a fluid comprising around 100% $CO_2$ or nitrogen) or energized and foamed fluids (typically a fracturing composition comprising less than about 75% nitrogen by volume when dealing with hydrocarbon based fluids).

A pure 100% gas fracturing composition will have minimal viscosity and instead will rely on high turbulence to transport proppant as it is pumped into the production zone. Unfortunately, while such techniques are effective in limited batch operations, the need for expensive, highly specialized, pressurized pumping, mixing and containment equipment substantially increases the cost of an effective fracturing operation. For example, a fracturing operation that can only utilize a batch process is generally limited in size to the volumetric capacity of a single pumping and containment unit. As it is economically impractical to employ multiple units at a single fracturing operation, the result is that very high volume gas fracturing operations can only be effectively employed in relatively limited circumstances. For example, a pure gas fracturing operation would typically be limited to pumping 300-32,000 kg of sand (proppant) into a well and may also be limited to the type of proppant that can be used in some circumstances.

The use of non-energized, energized and foamed fluids as fracturing fluids are generally not limited to batch operations as fluid mixing and pumping equipment for such fluids is generally not at the same scale in terms of the complexity/cost of equipment that is required for pure gas operations. In other words, the mixing and pumping equipment for a non-energized/energized/foamed fluid fracturing operation is substantially less expensive and importantly, can produce effectively large and continuous volumes of fracturing fluid mixed with most types of available proppant. That is, while a 100% gas fracturing operation may be able to deliver up to 32,000 kg of proppant to a formation, a non-energized/energized/foamed fluid fracturing operation may be able to deliver in excess of 10 times that amount.

The characteristics of energized and foamed fluids are briefly outlined below as known to those skilled in the art.

An energized fluid will generally have less than about 53% (volume % at down hole pressure and temperature) gas together with a liquid phase typically either water or hydrocarbon based. An energized fluid is further characterized by a continuous fluid phase with gas bubbles that are not concentrated enough to interact with each other to increase viscosity. For example, the overall viscosity of an energized fluid comprised of a fluid phase and nitrogen gas may be in the range of 200 cP which is a "mid-point" between the viscosity of a typical hydrocarbon-based phase (300 cP) and a nitrogen gas phase (0.01 cP). As is known, and in the context of this description, viscosity values measured in centipoise (cP) are dependent on shear rate and temperature. In this specification, all viscosity values are referenced to a shear rate of 170 $sec^{-1}$ and 293 K.

Foams will generally have greater than about 53 vol % gas but less than about an upper limit of 75 vol % gas with the remainder being a gelled liquid hydrocarbon phase. Stable hydrocarbon foams generally have an upper limit that is lower than that of water foams, which for water is about 85 vol %. Foams are characterized as having a continuous fluid film between adjacent gas bubbles where the gas bubbles are concentrated enough to interact with each other to increase viscosity. Foams require the addition of foaming agents that promote stability of the gas bubbles. For example, the viscosity of a hydrocarbon foam will typically be in the range of 200-1000 cP which may be 2 to 10 times greater than the viscosity of the hydrocarbon liquid phase (20-800 cP) and many times greater than the viscosity of the gas phase (0.01-0.1 cP).

Hydrocarbon based fluids behave differently than water based fluids in terms of the solubility preferences between nitrogen and carbon dioxide, the two most commonly used fracturing gases as well as other factors as discussed below. Water based fluids have similar solubility properties with either gas under a large range of pressures and temperatures, wherein nearly all the added gas forms a second and distinct gas phase when creating a foam or emulsion. In comparison, hydrocarbon based fluids have a tendency to combine with carbon dioxide to form a single miscible phase under some temperatures and pressures whereas nitrogen has a very small solubility in hydrocarbon fluids. As such, carbon dioxide miscibility with the hydrocarbon based fluid, depending on the pressure and temperature, can range in effect from completely involving all mixed gas to leave a single miscible liquid phase without a gas phase to having nearly a liquid hydrocarbon phase with a gas phase and no miscibility effects.

In addition, when a hydrocarbon based fluid includes chemical additives at sufficient concentrations to cause various effects, and with carbon dioxide forming a single miscible phase with the hydrocarbon, a hydrocarbon/carbon dioxide system may have the effect of diluting the active chemicals and changing the fluid properties.

Further still, the amount of carbon dioxide that will form a single miscible phase with hydrocarbon based fluids is highly variable depending on the pressure, temperature and specific blend of components of the hydrocarbon fluid which may be affected by pressure and temperature in the wells during a fracturing operation.

Furthermore, hydrocarbon based fluids have a greater chemical sensitivity to carbon dioxide gas compared to nitrogen gas. The most commonly used breaker technology for hydrocarbon fluids is a high pH breaker such as magnesium oxide as the active ingredient. Carbon dioxide creates a low pH in trace water which can counteract the high pH breaker to affect the designed fluid chemistry to form viscosity and reduce it again over an intended quantity of time.

There are also differences in safety implications regarding hydrocarbon based fluids and water based fluids. For example, the normal injection methods of water based fracturing fluids into a well and ultimately the production formation will utilize either of or a combination of tubing, casing or coiled tubing. For hydrocarbon based fracturing fluids, these fluids are normally restricted from being injected via coiled tubing due to the safety risk in the event of a coiled tubing leak or burst, and accordingly would normally be restricted to injection via casing, tubing or manifolded casing and tubing. Moreover, the safety risk is intensified when compressed gases are combined with the hydrocarbon based fluid.

Mists

As is known, when the gas concentration is increased above about 75% in a hydrocarbon based fluid or above about 85% for water based fluids, (typically 90-97%), the stability of a typical foam will decrease, such that the foam will "flip" such that the gas phase becomes continuous and the liquid hydrocarbon phase is dispersed with the gas phase as small droplets or in larger slugs. This is commonly referred to as a "mist". The viscosity of a mist will generally revert to a "mid-point" of viscosity close to that of the gas (i.e. approximately 1-3 orders of magnitude lower than that of a foam) with the result being that the ability to support proppant based on viscosity is substantially reduced.

As a result, fracturing compositions generally avoid the formation of mists and instead favor stabilizing foams and otherwise maximizing viscosities.

A review of the prior art shows that the active promotion and use of a mist as a fracturing composition within hydrocarbon based fracturing fluids has not been considered.

For example, U.S. Pat. No. 7,261,158 discloses a high concentration gas fracturing composition that is a "coarse foam"; U.S. Pat. No. 6,844,297 discloses fracturing compositions including an amphoteric glycinate surfactant that increases viscosity and enables viscosity control of the compositions through pH adjustment; U.S. Pat. No. 6,838,418 discloses fracturing fluid including a polar base, a polyacrylate and an "activator" that ionizes the polyacrylate to a hydroscopic state; U.S. Pat. No. 4,627,495 discloses methods using carbon dioxide and nitrogen to create high gas concentration foams; U.S. Pat. No. 7,306,041 discloses acid fracturing compositions that contain a gas component; US Publication 2007/0204991 describes a method and apparatus for fracturing utilizing a combined liquid propane/nitrogen mixture; US Publication 2006/0065400 describes a method for stimulating a formation using liquefied natural gas; and, US Publication 2007/0023184 describes a well product recovery process using a gas and a proppant.

SUMMARY OF THE INVENTION

In accordance with the invention, there is provided fracturing fluid compositions and methods of preparing and using such compositions for fracturing a well.

In its broadest form, the fracturing fluid compositions comprise: a liquid component for temporarily supporting a proppant within the liquid component at surface, the liquid component including: a viscosified liquid hydrocarbon component having an initial viscosity sufficient to temporarily support proppant admixed within the viscosified liquid hydrocarbon component; and, a breaker for relaxing the viscosity of the viscosified liquid hydrocarbon component within a pre-determined period; wherein the concentration of breaker within the liquid component is sufficient to relax the initial viscosity of the liquid component to less than 10 cP at 170 sec$^{-1}$ at 293K within a pre-determined time period of 30 minutes.

In further embodiments, the fracturing fluid composition further includes a proppant admixed within the viscosified liquid hydrocarbon component. Still further, the composition may include a gas component admixed with the liquid hydrocarbon under high turbulence conditions sufficient to support the proppant within a combined liquid hydrocarbon/gas component mixture wherein the combined liquid hydrocarbon/gas component mixture is characterized as a mist or liquid slug. The gas component may be nitrogen.

In further embodiments, the combined liquid hydrocarbon/gas component mixture is 3-25 vol % liquid component and 75-97 vol % gas component exclusive of the proppant.

In another embodiment, the pre-determined period is less than 10 minutes.

In one embodiment, the initial viscosity of the liquid component is 15-1000 centipoise (cP) at 170 sec$^{-1}$ at 293K prior to mixing with proppant or gas component.

In other embodiments, the mass of proppant is 0.25-5.0 times the mass of the liquid component or 1.0-2.5 times the mass of the liquid component.

In other embodiments, the viscosified liquid hydrocarbon component includes 0.4-3.0 wt % gelling and complexor agents. In yet further embodiments, the gelling agent may be a phosphate ester and the complexor agents may be any one of or a combination of iron sulphate and an amine complexing agent. In one embodiment, the breaker is magnesium oxide or calcium oxide.

In one embodiment, the liquid component includes less than 0.1 vol % non-foaming surfactant.

In another aspect of the invention, a method of fracturing a formation within a well is provided comprising the steps of: preparing a liquid component at surface in a blender, the liquid component including: a viscosified liquid hydrocarbon component having an initial viscosity sufficient to temporarily support proppant admixed within the viscosified liquid hydrocarbon component; and, a breaker for relaxing the viscosity of the viscosified liquid hydrocarbon component within a pre-determined period wherein the concentration of breaker within the viscosified liquid hydrocarbon component is sufficient to relax the viscosity of the liquid hydrocarbon component to less than 10 cP at 170 sec$^{-1}$ at 293K within 30 minutes; mixing the proppant into the liquid component in the blender; introducing the proppant/liquid component into a high pressure pump and increasing the pressure to well pressure; introducing a gas component the high pressure pump and increasing the pressure to well pressure; mixing the gas component with the proppant/liquid component under high turbulence conditions; and, pumping the combined gas and fluid at a high rate down the well.

In one embodiment, the combined gas and fluid is characterized as a mist or slug at the formation.

In further embodiments, the combined gas and fluid in step f) is 3-25 vol % liquid component and 75-97 vol % gas component exclusive of the proppant.

In another embodiment, the initial viscosity of the viscosified liquid hydrocarbon component is 15-1000 centipoise (cP) at 170 sec$^{-1}$ at 293K prior to mixing with proppant or gas component.

In further embodiments the mass of proppant mixed in is 0.25-5.0 times the mass of the liquid component.

In other embodiments, the viscosified liquid component includes 0.4 to 3.0 wt % gelling and complexor agents that may be selected from phosphate esters, magnesium oxide and calcium oxide.

Non-foaming surfactant may be mixed with the viscosified liquid component.

In one embodiment, the process is continuous (i.e. non-batch) and may be preceded by a 100% gas pad.

BRIEF DESCRIPTION OF THE FIGURES

The invention is described with reference to the accompanying figures in which.

DETAILED DESCRIPTION

With reference to the accompanying figures, novel fracturing compositions, methods of preparation and methods of use are described. Importantly, the subject technologies overcome problems in the use of mists as an effective fracturing composition particularly having regard to the ability of a mist to transport an effective volume of proppant into the formation. As a result, the subject technologies provide an effective economic solution to using high ratio gas fracturing compositions that can be produced in a continuous (i.e. non-batch) process without the attendant capital and operating costs of current pure gas fracturing equipment.

Generally, compositions prepared in accordance with the invention include a liquid component (hydrocarbon-based component) and a gas component in proportions that promote the formation of a mist. In the context of this description reference to a gas component refers to a compound that is a gas at standard temperature and pressure (288 K and 1 atm) such as nitrogen that is used in fracturing.

More specifically, the present compositions include a 3-25% liquid component (typically about 5%) and a 75-97% gas component (typically about 95%).

Figure 1:
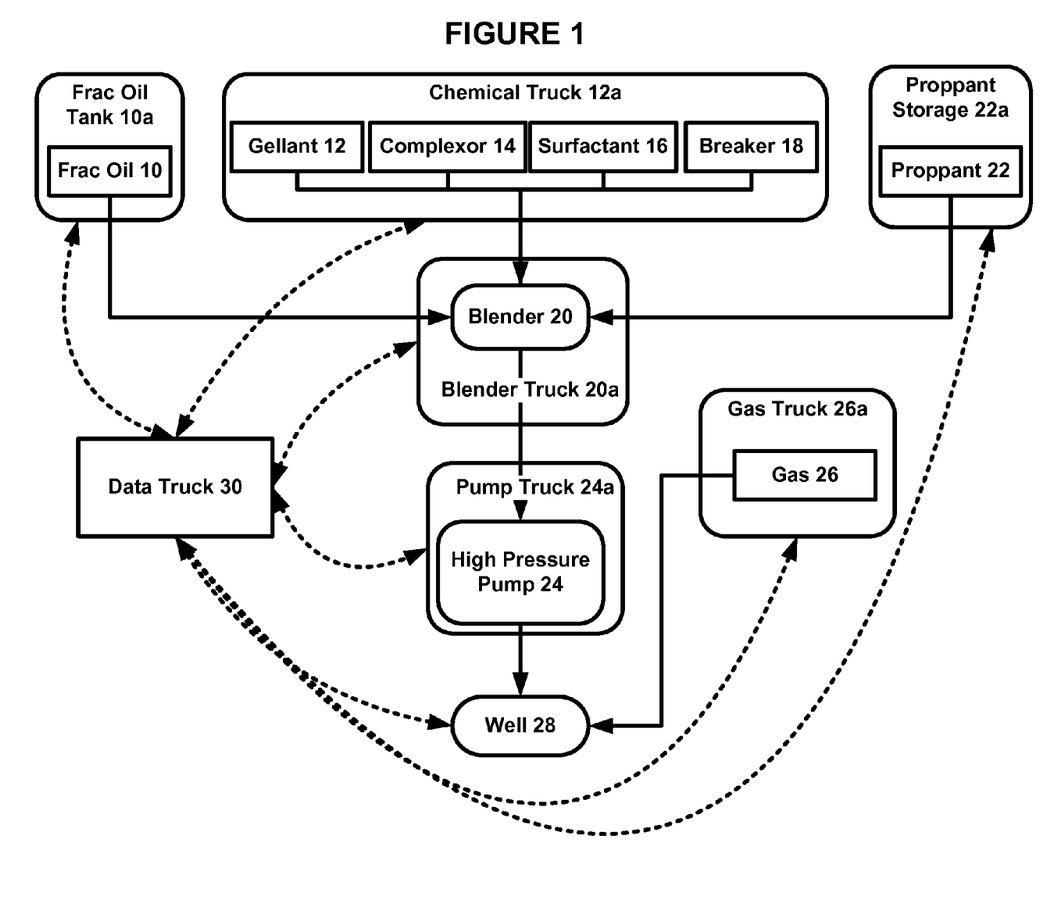
FIG. 1 is an overview of a typical equipment configuration for a fracturing operation in accordance with the invention.

With reference to FIG. 1, fracturing fluid compositions are generally prepared and utilized in accordance with the following methodology:
a. A liquid component (e.g. frac oil 10) having desired properties is prepared at surface in a blender 20 with chemical additives (e.g. gellant 12, complexor 14, surfactant 16, breaker 18) from chemical truck 22a and frac oil tank 10a.
b. Proppant 22 from proppant storage 22a is added to the liquid component;
c. The combined liquid/proppant mixture is introduced into a high pressure pump 24 and pressurized to well pressure by the high pressure pump in pump truck 24a;
d. A gas component 26 (typically, nitrogen) is introduced into a high pressure line leading to the well 28 where it mixes with the combined liquid/proppant mixture;
e. The pressurized combined liquid/proppant/gas is pumped at a high rate down the well 28;
f. The fracturing operation proceeds with the above fracturing fluid compositions being continuously prepared at the surface with varying ratios;
g. Upon completion, surface mixing and pressurization are ceased and the surface equipment is detached and removed from the well;
h. The well is flowed to remove as much fracturing gas and liquid component as possible and turned over to production of hydrocarbons from the production zone;
i. Control of the system and data from the system is provided by or received by data truck 30.

It is understood that in normal fracturing operations using methods described herein, proppant stages would be preceded by a 100% gas pad stage.

As shown in FIG. 1, and as will be explained in greater detail below, the preparation and blending of the liquid and gas components is achieved at a well site utilizing portable equipment.

Importantly, in comparison to past non-energized, energized or foamed fluid technologies, the subject technology does not require the supply of as high volume of fluids for injection nor the disposal of as high volumes of fluids recovered from the well as the relative proportion of liquid hydrocarbon in the overall fracturing fluid composition is substantially lower than that of a non-energized, energized or foamed fluid. In comparison to past 100% pure gas technologies, the subject technology, by virtue of the liquid component supporting proppant prior to mixing, the need for specialized, pressurized batch mixing equipment is eliminated.

Fluid Compositions

Liquid Component

The liquid component generally comprises (A) a gelled liquid hydrocarbon, (B) a breaker, and (C) a non-foaming surfactant(s). The liquid component is designed to impart adequate but short-lived viscosity to the liquid component such that proppant can be temporarily supported within the liquid component at surface without settling and plugging surface pumping equipment. It is further designed such that the viscosity of the liquid component promptly relaxes during and after fracturing to promote mist or liquid slug formation and ensure flow back to the well. In the context of this description, viscosity is measured at 170 $sec^{-1}$ and referenced to 293K.

A—Gelled Liquid Hydrocarbon

The gelled liquid hydrocarbon is formed from about 98 wt % liquid hydrocarbon, 0.51 wt % alkyl phosphate ester, 0.09 wt % aryl ether phosphate ester (gelling agents), 0.29 wt % ferric sulphate (complexor), and 0.12 wt % C2-C18 tertiary alkoxylated amines (complexor). The complexors act as crosslinkers to increase viscosity by chemically linking polymer chains together. Suitable gelling agents are known to those skilled in the art. Preferred gelling agents are phosphate esters. Gelling agents are typically liquids so as to promote easy operational mixing and continuous mixing with liquid hydrocarbon. The viscosity range generated can be from 50 to 1000 cP but, as noted, are shear and temperature sensitive.

B—Breaker

The breaker is typically a pH shifting agent added to the liquid component for relaxing viscosity in a controlled manner. Suitable breakers include those known to those skilled in the art such as magnesium oxide. Typically, a breaker in the present invention is selected that reduces liquid component viscosity over a maximum 30 minute time period and preferably 10 minutes or less. For example, liquid component viscosity may initially be in the range of 50 to 1000 cP at a shear rate of 170 $sec^{-1}$ and be effectively reduced to 1-10 cP over a 90 minute period. The amount of magnesium oxide and temperature are measured and/or controlled to provide the designed relaxation in viscosity.

In one embodiment, breaker activity is controlled to relax viscosity within about 10 minutes so as to more readily promote the formation of a mist or liquid slugs.

C—Surfactant

Surfactant is a further additive that is intended to prevent the formation of emulsions if the hydrocarbon comes into contact with in situ formation water, if present. More specifically, the surfactant is designed to promote the return of the liquid component back to the well after pressure release by allowing less fluid to be trapped in the reservoir matrix pores due to interaction with formation water and rock as known to those skilled in the art.

With reference to Table 1, various liquid component compositions are described. In accordance with the invention, it is understood that the primary functions of the liquid component is to temporarily support proppant for a short time at surface prior to mixing with the gas component but not promote the formation of stable foams on mixing. As such, various additives including surfactants are not essential to the invention in that in specific applications, surfactants may not be added to the fluid composition.

TABLE 1

Liquid Component Additives

| Additive | | Amount (% of total liquid component) | Examples and/or Composition (% of unmixed component) |
|---|---|---|---|
| A-Gelled Liquid Hydrocarbon | Liquid hydrocarbon | 98 wt % | One of many frac oil of many brands from many public suppliers. For example, FO 200 from the supplier ICTC, an ECL Company, is 5 to 10 wt % aromatics and 90 to 95 wt % aliphatics. |
| | Gelling | 0.2-1.5 | Phosphate ester (Century Oilfield |

TABLE 1-continued

Liquid Component Additives

| | Additive | Amount (% of total liquid component) | Examples and/or Composition (% of unmixed component) |
|---|---|---|---|
| | Agent Complexor | wt % 0.2-1.5 wt % | Services Inc., Calgary, Alberta) Iron sulphate and amine blend (Century Oilfield Services Inc., Calgary, Alberta) |
| B-Breaker | Breaker | .1-10 vol % | Magnesium oxide 20 to 40 wt % diluted in mineral oil 60 to 80 wt % and 1 wt % suspension package (Century Oilfield Services Inc., Calgary, Alberta) |
| C-Surfactant | Surfactant | <0.1 vol % | Non-foaming Surfactant/Demulsifier eg. Alkyl Alkoxylate, Organic Polyol (Century Oilfield Services Inc., Calgary, Alberta) |

Field Methodology and Equipment

As noted above, FIG. 1 shows an overview of the equipment and method of fracturing a well in accordance with the invention. Base fluids including liquid hydrocarbon 10 (from liquid hydrocarbon tank 10a), gelling agent 12, complexor 14, surfactant 16 and breaker 18 (from a chemical truck 12a) are selectively introduced into a blender 20 (on blender truck 20a) at desired concentrations in accordance with the desired properties of the fluid composition. Upon establishment of the desired viscosity of the fluid composition, proppant 22 (from proppant storage 22a) is added to the composition and blended prior to introduction into a high pressure pump 24 (on pump truck 24a). Gas 26 (from gas truck 26a) is introduced to a high pressure line between the high pressure pump 24 and a well 28 prior to introduction into the well 28. A data truck 30 is configured to the equipment to collect and display real time data for controlling the equipment and to generate reports relating to the fracturing operation.

The blender blends the base fluids and proppant and chemical and includes appropriate inlets and valves for the introduction of the base fluids from the liquid hydrocarbon tanks and chemical truck and proppant storage. The blender preferably includes a high shear tub capable of blending in the range of 1000-5000 kg (preferably about 2200 kg) of proppant per m$^3$ of fluid.

The base liquid components including gelling agent, complexor, non-foaming surfactant and breaker are delivered to a field site in a chemical truck 12a. The chemical truck includes all appropriate chemical totes, pumps, piping and computer control systems to deliver appropriate volumes of each base liquid component to the blender 20.

Liquid hydrocarbon tanks 10a include valves to deliver liquid hydrocarbon to the blender via the blender hoses.

The high pressure pump(s) typically each have a nominal power rating in the range of 1500 kW and be capable of pumping up to 2 m$^3$/minute of liquid fracturing fluid and proppant through 4.5-5" pump heads in order to produce surface operating well pressures up to 103.5 psi. Depending on the size of the fracturing operation, 1-6 liquid high pressure pumps may be required.

Nitrogen is the gas predominantly used in field applications to dilute the slurry of fluid and proppant from the high pressure pump. For clarity in describing the fracturing fluid composition, in the industry and in the context of this description, it is known that nitrogen is bought and sold and measured in terms of its volume with reference to standard conditions (1 atm and 15 C or thereabouts and referred to in units of "scm" (standard cubic meters or cubic meters under standard conditions as noted above). The physical state of nitrogen received at a well site is in a refrigerated liquid form stored at about 1 atm gauge pressure (2 atm absolute pressure) and about −145 C to −190 C. The ratio of 1 m$^3$ of liquid nitrogen as delivered is equivalent to about 682 scm at standard atmospheric conditions. Nitrogen is pumped in its cryogenic liquid state taking it from storage pressure to well pressure, then gasified by heating it to 20 C, whereupon it enters the high pressure line where it mixes with the fracturing liquid composition and proppant.

This turbulent mixture is then pumped down the well where it warms up to as much as the formation temperature and reaches the pressures used to fracture the production zone. The estimated temperature and pressure under pumping conditions of the production zone is used to estimate the compression of nitrogen in the form of the number of standard cubic meters per cubic meter of actual space at the production zone.

For example, 1 m$^3$/min of cryogenic liquid from the nitrogen truck may be pressurized to 20 MPa surface pressure, heated to 20 C, mixed with the fluid and proppant at the desired volume % ratios and pumped in the well to the production zone. If the pumping pressure and temperature of fracturing into the production zone is 18 MPa and 30 C, the compression at these conditions is about 160 scm occupying 1 m$^3$ of actual space. The 682 scm/min of nitrogen rate as it would be referred to in the field operations relates to an actual flow rate into the production zone during fracturing of 4.26 m$^3$/min (682 scm/min divided by the compression ratio of 160 scm/m$^3$). When the frac is flowed back, as pressure and temperature changes the nitrogen gas expands as it flows with fluid to flow back tanks at surface for separation and disposal.

Generally, the fracturing composition is formulated for a desired composition input to the formation at formation conditions. As such, the ratio between the fluid component and gas component as measured in volume % at the surface will likely be different to what is delivered at the formation. As known to those skilled in the art, the difference between surface pressure and bottom hole pressure may have either a positive or negative variance depending on parameters including the hydrostatic pressure and friction pressures between the surface and the formation. For example, for a typical fracturing composition in accordance with the invention, where a 10/90 volume % liquid/gas composition is to be injected at the formation, may depending on the depth of the formation and the friction pressures of the specific composition conveyance equipment require either higher or lower ratio of liquid to gas mixing at surface at a given surface pressure.

Lab Examples

Test samples of the fluid composition were prepared in accordance with the following general methodology. A volume of a base fluid (for example FO-200 liquid hydrocarbon from Innovative Chemical Technologies Canada Ltd. (ICTC, an ECL Company) was measured in a beaker from a bulk source and added to a variable speed Waring blender. The fracturing liquid component additives were measured in disposal plastic syringes from bulk sources. The Waring blender was turned on to an appropriate speed and the additives were added to the base fluid sequentially. The samples were blended for about 0.5 minutes (or slightly longer as required). To foam a sample, the Waring blender was turned to a higher speed setting for at least 10 seconds. The fracturing fluid test sample was then ready to be used in the various experiments.

Test samples of the proppant (sand) were prepared in accordance with the following general methodology. All proppant was taken from a bulk source as common products available to industry.

Test samples of the fluid were measured for proppant (sand) support under static conditions using the following general methodology. A fracturing fluid composition was prepared and a sand sample was obtained according the previous methodologies described. 90% of the volume of a fluid sample was blended without sand in one Waring blender. The remaining 10% of the volume of a fluid sample was blended with sand in a second Waring blender. The fluid sample without proppant was quickly placed in a graduated cylinder with the sand laden fluid sample placed on top. The sand volume accumulation was observed at the bottom of the graduated cylinder and compared to the initial proppant sample used. A longer accumulation time (i.e. a lower fall rate for the particles) indicated a greater tendency of the fracturing fluid to support proppant.

Test samples of the fluid were measured for viscosity with the following general methodology. A Brookfield PVS rheometer (Brookfield Engineering Laboratories, Middleboro, Mass.) was utilized to measure the viscosity of the liquid fracturing fluid compositions. The oil bath temperature was set to a specific temperature according to each experiment. 250 mL of liquid fracturing fluid composition was blended in a Waring blender. A 50 mL plastic syringe was used to transfer a 35 mL sample from the prepared liquid fracturing fluid composition in the Waring blender to the rheometer cup. The cup was screwed on the rheometers such that the bob was appropriately immersed in the fluid, the sealed cup was exposed to 400 psi nitrogen gas above the fluid, and the cup immersed in the oil bath for temperature control according to the general procedures as known to those skilled in the art.

Experiments

Viscosity vs. Time

Figure 2:
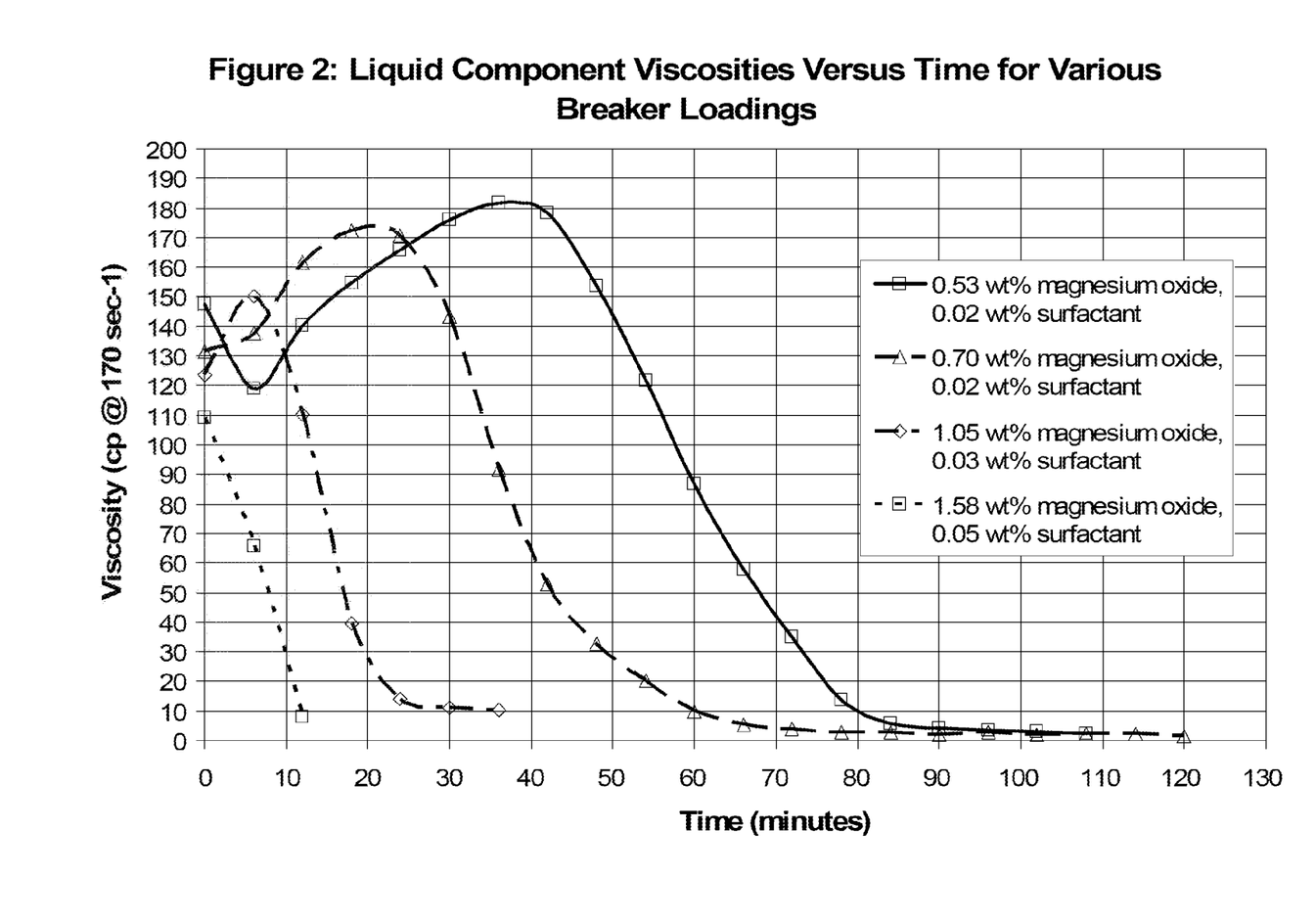
FIG. 2 is a graph showing liquid component viscosity vs. time for different concentrations of breaker.

FIG. 2 shows the effect of varying breaker concentration on viscosity of a liquid fracturing fluid composition as a function of time. The fluid composition was a blend of FO 200 Frac Oil with 0.51 wt % alkyl phosphate ester, 0.09 wt % aryl ether phosphate ester, 0.29 wt % ferric sulphate, 0.12 wt % C2-C18 tertiary alkoxylated amines, 0.03 wt % surfactant and varying wt % of magnesium oxide. The viscosity was measured at 20° C. and a shear rate of 170 sec$^{-1}$. As shown, as the breaker concentration is varied from 0.53 to 1.58 wt %, the viscosity of the fluid composition relaxes in approximately one tenth of the time to 10 cP at a shear rate of 170 sec$^{-1}$ (6 to 12 minutes compared to 78 to 84 minutes).

Past fracturing stimulation operations involving hydrocarbon base fluids finish in significantly more time than 6 to 12 minutes. The standard, as known to those skilled in the art, is to have higher viscosity values until the design time planned for the fracturing stimulation plus contingency time is reached which is usually, or by default, to be about 90 minutes. This invention demonstrates that the temporary viscosity of the fracturing fluid is brought below 10 cP (considered a "broken" or relaxed fluid) before the fracturing stimulation operation is finished (or before the proppant is substantively delivered to the formation).

Foam Stability

Figure 3:
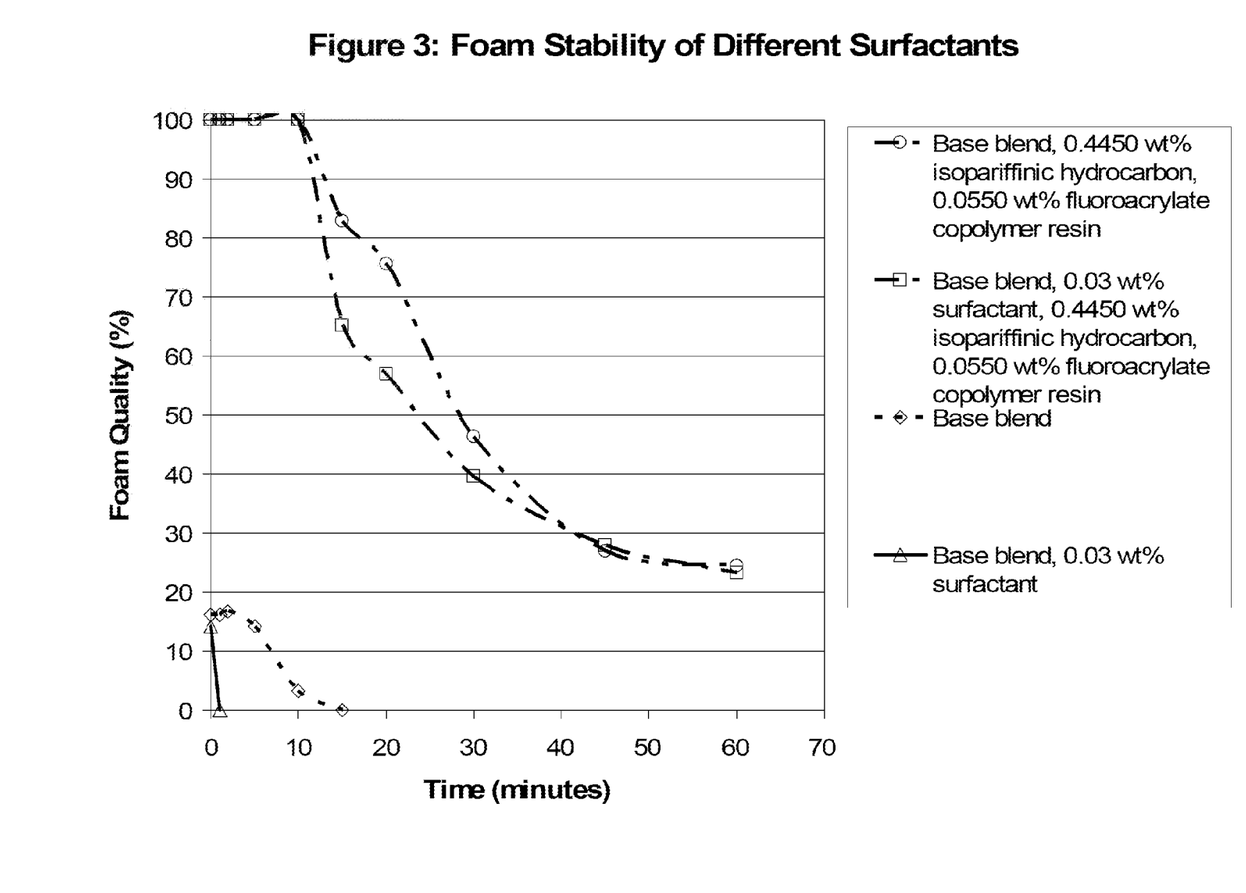
FIG. 3 is a graph showing foam stability vs. time for liquid component compositions having different concentrations of foaming or non-foaming surfactant agents.

FIG. 3 shows the effect of introducing additives that are known foaming agents as compared to other additives with a null effect on foaming by measuring foam stability as a function of time. A blend of liquid hydrocarbon base fluid with additive concentrations of 0.34 wt % alkyl phosphate ester, 0.06 wt % aryl ether phosphate ester, 0.19 wt % ferric sulphate, 0.08 wt % C2-C18 tertiary alkoxylated amines, 0.91 wt % magnesium oxide, 0.06 wt % surfactant, and various additives and loadings of foaming surfactant agents and non-foaming surfactant agents are shown in FIG. 3. In these experiments, the liquid fracturing fluid composition was agitated in a Waring blender at the 100% (maximum) speed setting to produce foam. After cessation of agitation, the height of the foam was measured immediately and at time intervals thereafter.

As shown, the amount of foaming agents of 0.4450 wt % isoparaffinic hydrocarbon and 0.0550 wt % fluoroacrylate copolymer resin resulted in reasonable foam stability that shows the reference case of normal operation used in foam injections into wells. Reasonable foam stability was also observed with 0.03 wt % non-foaming surfactant with the foaming agents of 0.4450 wt % isoparaffinic hydrocarbon and 0.0550 wt % fluoroacrylate copolymer resin which shows that non-foaming surfactant agent neither significantly encourages or discourages the generation of a stable foam.

A standard gelled hydrocarbon blend as a pure liquid component is given for reference (specifically, 0.34 wt % alkyl phosphate ester, 0.06 wt % aryl ether phosphate ester, 0.19 wt % ferric sulphate, 0.08 wt % C2-C18 tertiary alkoxylated amines, 0.91 wt % magnesium oxide and 0.06 wt % surfactant).

However, a fluid containing 0.03 wt % of a non-foaming surfactant agent and the absence of foaming agents showed an almost instant collapse of foam stability after cessation of agitation.

This experiment shows that the gelled hydrocarbon component of the fracturing fluid can be created without foam quality.

Proppant Support

Figure 4:
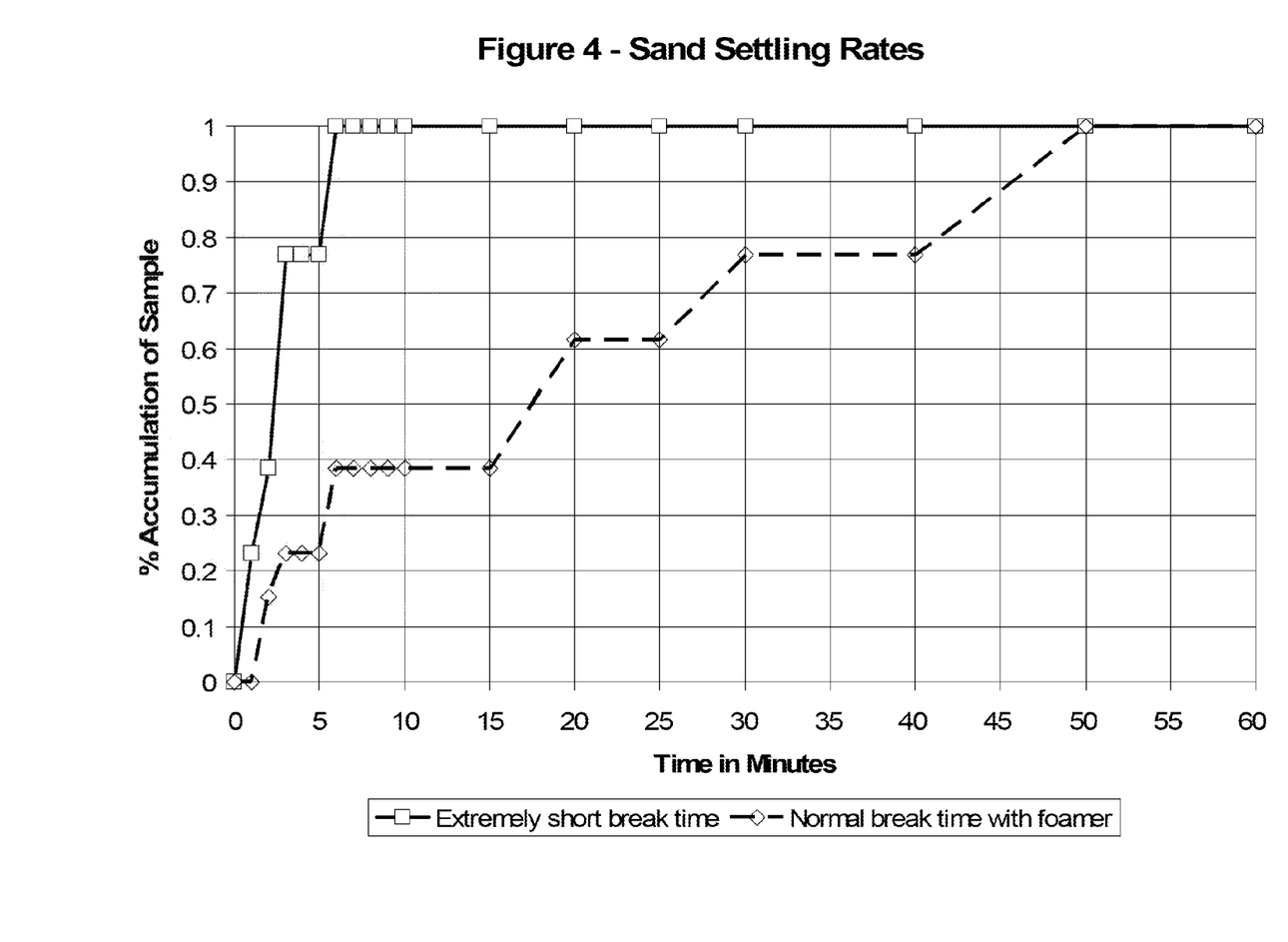
FIG. 4 is a graph showing proppant support characteristics from sand sample settling rates falling through liquid component compositions having different concentrations of breaker.

FIG. 4 shows the effect of proppant support in various fracturing fluid compositions that have varying breaker loadings and foam agent use. 500 mL of a common fracturing fluid composition for a foamed well injection was created using a FO-200 liquid hydrocarbon base fluid with additive concentrations of 0.34 wt % alkyl phosphate ester, 0.06 wt % aryl ether phosphate ester, 0.19 wt % ferric sulphate, 0.08 wt % C2-C18 tertiary alkoxylated amines, 0.91 wt % magnesium oxide, 0.03 wt % surfactant, 0.4450 wt % isoparaffinic hydrocarbon (foaming agent), 0.0550 wt % fluoroacrylate copolymer resin (foaming agent). The stirring/foaming method created a total foam height of 650 mL at the start of the experiment. This common fracturing fluid composition is represented by the curve labeled "normal break time with foamer". A new composition was created as a preferred embodiment of this invention was created using 1000 mL FO-200 liquid hydrocarbon base fluid with additive concentrations of 0.34 wt % alkyl phosphate ester, 0.06 wt % aryl ether phosphate ester, 0.19 wt % ferric sulphate, 0.08 wt % C2-C18 tertiary alkoxylated amines, 1.58 wt % magnesium oxide, 0.05 wt % surfactant. This new composition is represented by the curve labeled "extremely short break time" which had no foaming agents added and had highly elevated breaker additive concentrations. The stirring/foaming method created a total volume of 1000 mL (no added volume due to foam) which is a larger sample than the common fracturing composition to increase the accuracy of the extremely high sand fall rates. The fracturing compositions were mixed for 5 minutes prior to being used for the experiment to allow for the varying breaker amounts to cause a varying viscosity for the samples. 30/60 mesh Canadian sand was used (SG of 2.61) for this experiment. Sand sample settling rates were measured for each of the common and new fracturing compositions. FIG. 4 shows the sand sample accumulation times for the 2 trials. For 30/60 mesh Canadian sand, the fall rate of the common fracturing composition was 0.47 cm/minute, and the new fracturing composition in this invention is 6.03 cm/minute with the absence of foaming agents and increased breaker loadings. The new fracturing composition supports the sand much less effectively as it has 12.8 times the fall rate compared to the compositions commonly used by those skilled in the art.

FIELD EXAMPLES

The following are representative examples of field trials of the subject technology.

Field Example 1

50-08W4

The well was characterized by having perforations from 490 to 493.5 m in the Viking formation production zone. The stimulation was pumped down 139.7 mm, 20.8 kg/m, J-55 casing to attempt to place 10,000 kg of 20/40 sand into the production zone.

Prior to the fracture, the well was 1.82 E3M3/operating day.

At the job site, all truck-mounted equipment was positioned and connected in accordance with standard operating practice. All fluid tanks were filled with liquid hydrocarbon PWC-150 supplied by ICTC. Liquid hydrocarbon was heated to 15-25° C. prior to the fracturing operation.

The high pressure surface line pipe was pressure tested to 30.0 MPa, and the well had a maximum working pressure of 25.0 MPa.

At the perforation zone, an initial 100% nitrogen pad of 1500 scm (standard cubic meters) was injected into the producing zone to create at least one fracture at the rate of 500 scm/minute. After the initial 100% nitrogen pad, a fluid composition having a base fluid of liquid hydrocarbon with the additives of 0.51 wt % alkyl phosphate ester, 0.09 wt % aryl ether phosphate ester, 0.29 wt % ferric sulphate, 0.12 wt % C2-C18 tertiary alkoxylated amines, 1.58 wt % magnesium oxide, and 0.08 wt % surfactant was prepared in the blender.

Proppant (20/40 mesh sand) was admixed to the fluid composition at a ratio of 2000 kg of sand per $m^3$ of fluid. As known to those skilled in the art there may be several stages and fluid and proppant ratios developed before the well is flushed.

The rate of fluid/sand slurry mixture started at 0.64 $m^3$/min and was increased to 0.79 $m^3$/min during the proppant pumping. The overall perforation equivalent rate of gas, fluid and proppant in the formation was estimated to start at 5.10 $m^3$/min and was decreased to 4.61 $m^3$/min during the proppant stages.

Nitrogen gas was introduced to the high pressure line between the high pressure pump and well head. The nitrogen gas rate was varied to result in 3 different rates ranging from 304 scm/min down to 262 scm/min which diluted the fluid and sand composition pumped down the well to the formation. The gas quality (gas volume at the perforations divided by the gas and fluid volume at the perforations) was 100% in the pad and ranged between 86% and 82% in the proppant/fluid stages to result in an overall inject gas quality placed in the formation of 95.6%. The intended volume of proppant was not injected into the well, and this did not include the flush of the well of proppant, and only the material that passed the perforations into the production zone. The overall concentration of sand started at 100 kg of sand/$m^3$ of combined fluid and gas and increased to 200 kg/$m^3$ of combined fluid and gas.

Overall, the surface pressure during fracturing varied from about a lowest value of 11.0 MPa to 25.0 MPa (maximum surface pumping pressure limitation was reached) with an initial surface breakdown pressure to initiate the frac at 12.2 MPa. In total, 3,850 kg of proppant was delivered to the formation in 7 minutes from the time that the fracture operations started pumping until pumping was stopped.

Upon completion, the well was vacated and an estimated 1.8 $m^3$ of fluid was recovered from the well for disposal. In comparison to an energized fluid frac, this represented a 3 fold decrease in the amount of liquid hydrocarbon requiring disposal.

Gas flow rates from the well after fracturing averaged 3.64 E3M3/day flowing following the frac which represents a 200% increase in production.

Field Example 2

51-08W4

The well was characterized by having perforations from 529 to 537 m in the Medicine Hat formation production zone. The stimulation was pumped down 114.4 mm, 14.14 kg/m, J-55 casing to attempt to place 10,000 kg of 20/40 sand into the production zone.

Prior to the fracture, the well was 2.41 E3M3/operating day.

At the job site, all truck-mounted equipment was positioned and connected in accordance with standard operating practice. All fluid tanks were filled with liquid hydrocarbon PWC-150 supplied by ICTC. Liquid hydrocarbon was heated to 15-25° C. prior to the fracturing operation.

The high pressure surface line pipe was pressure tested to 30 MPa, and the well had a maximum working pressure of 24.0 MPa.

At the perforation zone, an initial 100% nitrogen pad of 3500 scm was injected into the producing zone to create at least one fracture at the rate of 500 scm/minute. After the initial 100% nitrogen pad, a fluid composition having a base fluid of liquid hydrocarbon with the additives of 0.51 wt % alkyl phosphate ester, 0.09 wt % aryl ether phosphate ester, 0.29 wt % ferric sulphate, 0.12 wt % C2-C18 tertiary alkoxylated amines, 1.58 wt % magnesium oxide, 0.08 wt % surfactant was prepared in the blender.

Proppant (20/40 mesh sand) was admixed to the fluid composition at a ratio of 2000 kg of sand per $m^3$ of fluid.

The rate of fluid/sand slurry mixture started at 0.63 $m^3$/min and increased to 2.44 $m^3$/min during the proppant pumping. The overall perforation equivalent rate of gas, fluid and proppant in the formation was estimated to start at 6.0 $m^3$/min and remain approximately constant during the proppant stages.

Nitrogen gas was introduced to the high pressure line between the high pressure pump and well head. The nitrogen gas rate was varied to result in 5 different rates ranging from 495 scm/min down to 329 scm/min which diluted the fluid and sand composition pumped down the well head to the formation. The gas quality (gas volume at the perforations divided by the gas and fluid volume at the perforations) was 100% in the pad and ranged between 94% and 79% in the proppant/fluid stages to result in an overall inject gas quality placed in the formation of 94%. This did not include the flush of the well of proppant, and only the material that passed the perforations into the production zone. The overall concentration of sand started at 1250 kg of sand/m³ of combined fluid and gas and increased to 425 kg/m³ of combined fluid and gas.

Overall, the surface pressure during fracturing varied from about a lowest value of 11 MPa to 12.9 MPa with an initial surface breakdown pressure to initiate the frac at 13.8 MPa. In total, 9,630 kg of proppant was delivered to the formation in 16 minutes from the time that the fracture operations started pumping until the well was flushed of proppant.

Upon completion, the well was vacated and an estimated 4.0 m³ of fluid was recovered from the well for disposal. In comparison to an energized fluid frac, this represented a 3 fold decrease in the amount of liquid hydrocarbon requiring disposal.

Gas flow rates from the well after fracturing were 3.93 E3M3/day the following full calendar month that the well was produced which was a 63% increase.

SUMMARY/CONCLUSIONS

In summary, the lab and field test data showed that substantially lower quantities of liquid hydrocarbon can be used to create fracturing compositions that in combination with novel mixing and pumping methods are effective in providing high mass proppant fractures. Importantly, the subject technologies demonstrate that the use of mists and/or slugs can be used as an effective fracturing composition particularly having regard to the ability of a mist and/or slug to transport an effective volume of proppant into the formation using conventional fracturing equipment. As a result, the subject technologies provide an effective economic solution to using high concentration gas fracturing compositions that can be produced in a continuous (i.e. non-batch) process without the attendant capital and operating costs of current pure gas fracturing equipment.

The invention claimed is:

1. A method of fracturing a formation within a well comprising the steps of:
    a) preparing a liquid component at surface in a blender, the liquid component including:
        i) a viscosified liquid hydrocarbon component having an initial viscosity sufficient to temporarily support proppant admixed within the viscosified liquid hydrocarbon component; and,
        ii) a breaker for relaxing the viscosity of the viscosified liquid hydrocarbon component within a pre-determined period wherein the concentration of breaker within the viscosified liquid hydrocarbon component is sufficient to relax the viscosity of the liquid hydrocarbon component to less than 10 cP at 170 sec$^{-1}$ at 293K within 30 minutes;
    b) mixing the proppant into the liquid component in the blender;
    c) introducing the proppant/liquid component into a high pressure pump and increasing the pressure to well pressure;
    d) mixing a gas component at high pressure with the proppant/liquid component under high turbulence conditions; and,
    e) pumping the combined gas and fluid from step d) at well pressure and at a high rate and down the well, wherein the combined gas and fluid is 3-25 vol % liquid component and 75-97 vol % gas component exclusive of the proppant.

2. A method as in claim 1 wherein the combined gas and fluid in step e) is characterized as a mist or slug at the formation.

3. A method as in claim 1 wherein the gas component is nitrogen.

4. A method as in claim 1 wherein the initial viscosity of the viscosified liquid hydrocarbon component is 15-1000 centipoise (cP) at 170 sec$^{-1}$ at 293K prior to mixing with proppant or gas component.

5. A method as in claim 1 wherein the mass of proppant mixed in step b) is 0.25-5.0 times the mass of the liquid component.

6. A method as in claim 1 wherein the mass of proppant mixed in step b) is 1.0-2.5 times the mass of the liquid component.

7. A method as in claim 1 wherein the viscosified liquid component includes 0.4 to 3.0 wt % gelling and complexor agents.

8. A method as in claim 7 wherein the gelling agent is a phosphate ester.

9. A method as in claim 7 wherein the complexor agents are any one of or a combination of iron sulphate and an amine complexing agent.

10. A method as in claim 1 wherein the pre-determined period is less than 10 minutes.

11. A method as in claim 1 wherein the breaker is magnesium oxide or calcium oxide.

12. A method as in claim 1 further comprising the step of mixing less than 0.1 vol % non-foaming surfactant with the viscosified liquid component.

13. A method as in claim 1 wherein proppant is partially supported within the combined gas and fluid in the well and production formation by turbulence.

14. A method as in claim 1 wherein the process is continuous.

15. A method as in claim 1 wherein step a) is preceded by a 100% gas pad.

16. A method of fracturing a formation within a well comprising the steps of:
    a) preparing a liquid component at surface in a blender, the liquid component including:
        i) a viscosified liquid hydrocarbon component having an initial viscosity sufficient to temporarily support proppant admixed within the viscosified liquid hydrocarbon component; and,
        ii) a breaker for relaxing the viscosity of the viscosified liquid hydrocarbon component within a pre-determined period wherein the concentration of breaker within the viscosified liquid hydrocarbon component is sufficient to relax the viscosity of the liquid hydrocarbon component to less than 10 cP at 170 sec$^{-1}$ at 293K within 30 minutes;
    b) mixing the proppant into the liquid component in the blender;
    c) introducing the proppant/liquid component into a high pressure pump and increasing the pressure to well pressure;
    d) mixing a gas component at high pressure with the proppant/liquid component under high turbulence conditions; and
    e) pumping the combined gas and fluid from step d) at a high rate down the well;
    wherein the mass of proppant mixed in step b) is 0.25-5.0 times the mass of the liquid component.

17. A method of fracturing a formation within a well comprising the steps of:
    a) preparing a liquid component at surface in a blender, the liquid component including:
        i) a viscosified liquid hydrocarbon component including less than 0.1 vol % non-foaming surfactant and having an initial viscosity sufficient to temporarily support proppant admixed within the viscosified liquid hydrocarbon component; and,
ii) a breaker for relaxing the viscosity of the viscosified liquid hydrocarbon component within a pre-determined period wherein the concentration of breaker within the viscosified liquid hydrocarbon component is sufficient to relax the viscosity of the liquid hydrocarbon component to less than 10 cP at 170 sec$^{-1}$ at 293K within 30 minutes;
b) mixing the proppant into the liquid component in the blender;
c) introducing the proppant/liquid component into a high pressure pump and increasing the pressure to well pressure;
d) mixing a gas component at high pressure with the proppant/liquid component under high turbulence conditions; and
e) pumping the combined gas and fluid from step d) at a high rate down the well.

\* \* \* \* \*